(12) United States Patent
Fortenberry

(10) Patent No.: US 6,313,934 B1
(45) Date of Patent: Nov. 6, 2001

(54) CHROMATIC DISPERSION MEASUREMENT SCHEME FOR OPTICAL SYSTEMS HAVING REMOTE ACCESS POINTS

(75) Inventor: Rance M Fortenberry, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/227,636

(22) Filed: Jan. 8, 1999

(51) Int. Cl.$^7$ .................................................. H04B 10/00

(52) U.S. Cl. ........................................ 359/172; 359/189

(58) Field of Search ................................ 359/189, 187, 359/172; 455/502, 456, 457, 347

(56) References Cited

U.S. PATENT DOCUMENTS

| | | | |
|---|---|---|---|
| 4,551,019 | 11/1985 | Vella et al. | 356/73.1 |
| 4,984,884 * | 1/1991 | Ryu | 356/73.1 |
| 5,406,308 * | 4/1995 | Horiuchi | 356/73.1 |
| 5,406,368 | 4/1995 | Horiuchi et al. | 356/73.1 |
| 6,256,507 * | 7/2001 | Lemieux | 455/502 |

FOREIGN PATENT DOCUMENTS 2183823 11/1986 (GB) ............................ G01M/11/02

* cited by examiner

Primary Examiner—Jason Chan
Assistant Examiner—David C Payne
(74) Attorney, Agent, or Firm—John L. Imperato

(57) ABSTRACT

A measurement scheme characterizes chromatic dispersion of an optical system having physically separated access points. A modulation signal at a local access point of the optical system and a reference signal at a remote access point of the optical system are generated and the signals are synchronized via timing signals derived from global positioning satellites (GPS). The modulation signal modulates optical test signals having predetermined optical wavelengths and the modulated optical test signals are applied to the local access point of the optical system. Modulated optical test signals are transmitted through the optical system from the local access point to the remote access point where the signals are demodulated. The time delay of the demodulated signal relative to the reference signal is measured at the remote access point by a phase comparison of the demodulated signal and the reference signal or alternatively by measuring the relative time delay directly. The relative time delay through the optical system as a function of optical wavelength provides a measure of chromatic dispersion of the optical system between the local and remote access points.

12 Claims, 2 Drawing Sheets

CHROMATIC DISPERSION MEASUREMENT SCHEME FOR OPTICAL SYSTEMS HAVING REMOTE ACCESS POINTS

BACKGROUND OF THE INVENTION

Chromatic dispersion within optical systems causes wavelength-dependent group delay variations that limit data rates, increase bit error rates and otherwise corrupt transmission of optical signals. Measuring chromatic dispersion of an optical system enables performance limitations of the optical system to be predicted. Additionally, once the chromatic dispersion is characterized it can be compensated for to improve system performance.

Typically, chromatic dispersion measurements are performed by characterizing the group delay of optical test signals at various optical wavelengths measured relative to a reference signal. Chromatic dispersion is readily measured when the measurement access points of the optical system are available to a single chromatic dispersion measurement instrument. However, optical systems such as installed fiber networks and other types of communication systems have access points that are physically remote from each other, making chromatic dispersion measurements using a single measurement instrument unfeasible. One approach to chromatic dispersion measurements of such optical systems transmits the reference signal from a local access point to a remote access point of the system using a separate optical fiber. Temperature variations, mechanical stress and other environmental effects on the fiber induce variations in the reference signal that reduce the accuracy and repeatability of the chromatic dispersion measurements. An alternate approach multiplexes the reference signal and the optical test signals within the optical system being characterized. While the multiplexing substantially reduces the impact of environmental effects on the chromatic dispersion measurements, this approach involves additional modulators and detection elements which increase the cost and complexity of the measurements. Accordingly, there is a need for a scheme for measuring chromatic dispersion of optical systems having remote access points, that is independent of environment effects and that has low cost and complexity.

SUMMARY OF THE INVENTION

A chromatic dispersion measurement scheme constructed according to the preferred embodiment of the present invention has low cost and complexity and enables chromatic dispersion of optical systems having physically separated access points to be characterized independent of environmental effects. The scheme generates a modulation signal at a local access point of the optical system and generates a reference signal at a remote access point of the optical system. The modulation signal and the reference signal are synchronized via timing signals derived from global positioning satellites (GPS). The modulation signal modulates optical test signals having predetermined optical wavelengths and the modulated optical test signals are applied to the local access point of the optical system. Modulated optical test signals are transmitted through the optical system from the local access point to the remote access point where the signals are demodulated. The time delay of the demodulated signal relative to the reference signal is measured at the remote access point using an oscilloscope or other measurement instrument. Alternatively, the relative time delay is determined by a phase comparison of the demodulated signal and the reference signal that produces a phase difference signal. The phase difference signal at each optical wavelength corresponds to the relative delay of the optical test signal through the optical system at the optical wavelength. The relative delay through the optical system as a function of optical wavelength provides a measure of chromatic dispersion of the optical system between the local and remote access points.

DETAILED DESCRIPTION OF THE PREFERRED EMBODIMENT

Figure 1:
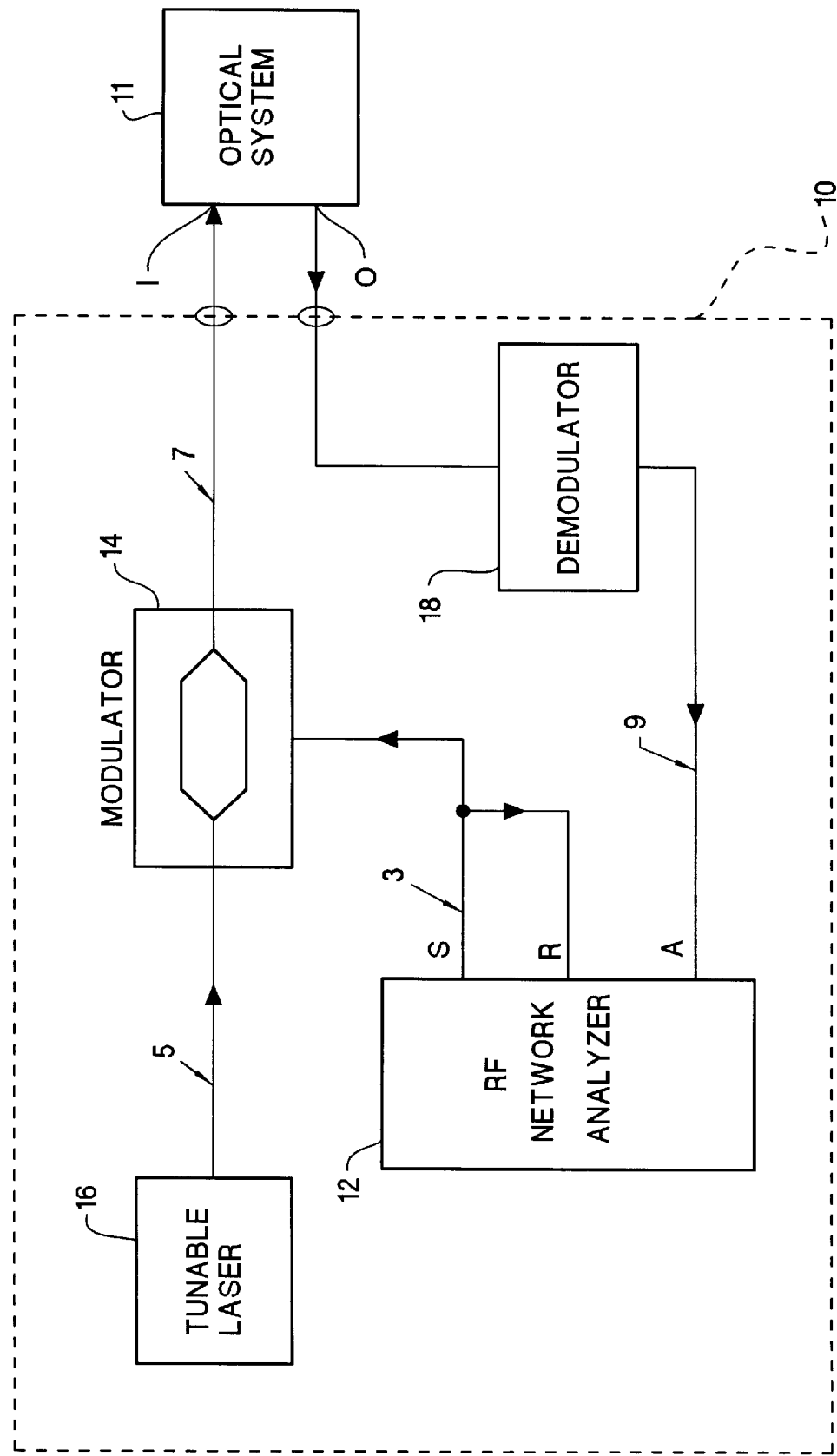
FIG. 1 shows a prior art chromatic dispersion measurement instrument.

FIG. 1 shows a prior art chromatic dispersion measurement instrument 10. The measurement instrument 10 characterizes chromatic dispersion between access points of an optical system 11, such as an input port I and an output port O of the system 11. A modulating signal 3, provided by a stimulus port S of an RF network analyzer 12, is applied to an amplitude modulator 14 which amplitude modulates an optical signal 5 supplied to the modulator 14 by a tuneable laser 16. The modulating signal 3 is also provided to a reference port R of the network analyzer 12. Amplitude-modulated optical signals 7 are applied to the input port I of the optical system 11. At the output port O of the optical system 11 the resulting optical signal is demodulated by a demodulator 18 to produce a demodulated signal 9 that is applied to the measurement port A of the network analyzer 12. The demodulated signal 9 is phase compared to the modulating signal 3 applied to the reference port R of the network analyzer 12. The phase comparison produces a phase difference signal that corresponds to the group delay of the optical system 11 at the optical wavelength of the optical signal 5. The phase comparison is performed at the various optical wavelengths provided by the tuneable laser 16. Variations in group delay as a function of optical wavelength, measured relative to the reference signal, provides a measurement of the chromatic dispersion of the optical system.

The chromatic dispersion measurement instrument 10 relies on availability of the modulating signal 3 at the input port I of the optical system 11 to modulate the optical signals 5, and at the output port O of the optical system 11 for use as a reference for phase comparison with the demodulated signal 9. This prior art measurement instrument 10 is well suited for characterizing chromatic dispersion of optical systems 11 in which access points I, O are both available to the measurement instrument. However, many types of optical systems, such as installed fiber networks and other communication systems have access points that are physically separated from each other. In these types of optical systems the modulating signal 3 is not available at both of the access points, making chromatic dispersion measurements difficult to perform using the prior art chromatic dispersion measurement instrument 10.

Figure 2:
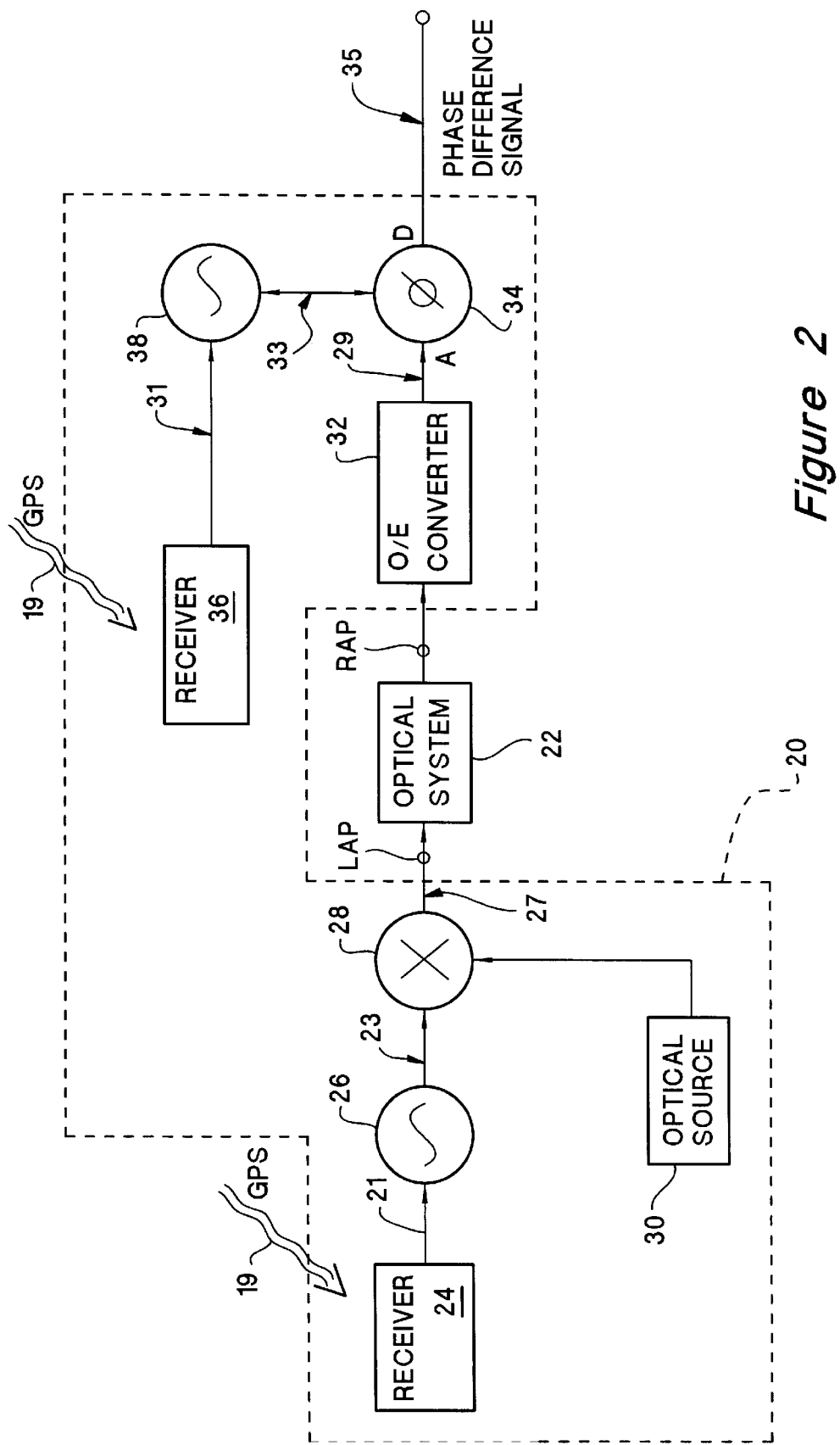
FIG. 2 shows a chromatic dispersion measurement scheme for optical systems having remote access points.

FIG. 2 shows a chromatic dispersion measurement scheme 20 constructed according to the preferred embodiment of the present invention. The measurement scheme 20 enables chromatic dispersion of an optical system 22 to be characterized even when the access points LAP, RAP of the system 22 are physically separated from each other. At a local access point LAP of the optical system 22, a receiver 24, such as the HP58503A model GPS Frequency Reference available from Hewlett-Packard Company, intercepts a clock signal 19 from global positioning satellites (GPS) and generates a local timing signal 21. The local timing signal 21 is applied to a signal generator 26 which generates a modulation signal 23. In this example, the modulation signal 23 is sinusoidal. The modulation signal 23 is applied to a modulator 28.

A series of optical test signals 25 are generated by an optical source 30, such as a tuneable laser to provide optical signals at predetermined wavelengths within the wavelength range over which the chromatic dispersion of the optical system 22 is characterized. The optical test signals 25 at each predetermined wavelength are applied to the modulator 28 and modulated by the modulation signal 23. In this example, the optical test signals 25 are amplitude modulated. Alternatively, other types of modulation is performed, such as pulse or frequency modulation.

A modulated test signal 27 from the modulator 28 is applied to the local access point LAP, such as an input port of the optical system 22. The modulated test signal 27 propagates through the optical system 22 where it is modified by chromatic dispersion within the optical system 22. At a remote access point RAP of the optical system 22, such as an output port of the optical system 22, an optical demodulator, such as an optical-to-electrical (O/E) converter 32 extracts a measurement signal 29 from the modulated test signal 27 as modified by the optical system 22. The measurement signal 29 is applied to a first input A of a phase comparator 34.

At the remote access point RAP of the optical system 22, a second receiver 36, such as the HP58503A model GPS Frequency Reference available from Hewlett-Packard Company, intercepts a clock signal 19 from GPS and generates a remote timing signal 31. The remote timing signal 31 is applied to a reference signal generator 38 which generates a reference signal 33 having a known frequency and phase relationship to the modulation signal 23 at the local access point LAP of the optical system 22, based on the derivation of both the local timing signal 21 and remote timing signal 31 from GPS clock signals 19. The reference signal 33 is applied to a second input R of the phase comparator 34 and a phase difference signal 35 is produced at an output D of the phase comparator 34, indicating the phase difference between the measurement signal 29 and the reference signal 33. While the second signal generator 38 and the phase comparator 34 are shown as separate elements, as an alternative, the signal generator 38 and phase comparator 34 are included within a network analyzer, where the reference signal 33 is provided at a stimulus port of the network analyzer, the reference signal 33 is applied to a reference port of the network analyzer and the measurement signal 29 is applied to a measurement port of the analyzer.

The phase difference signal 35 corresponds to the delay of the modulated test signal 27 through the optical system 22 at each of the predetermined optical wavelengths, as measured relative to the reference signal 33. The time delays between the reference signal 33 and the measurement signal 29 at each of the optical wavelengths of the optical test signals 25 are determined from the phase difference signal 35 based on the fundamental relationship between phase difference and time delay. The change in the time delay versus optical wavelength provides the chromatic dispersion measurement for the optical system 22.

The time delay between the reference signal 33 and the measurement signal 29 is determined from a phase comparison of these signals. Alternatively, time delay between the reference signal 33 and the measurement signal 29 at each of the corresponding optical wavelengths is measured directly using an oscilloscope or other instrument that measures time delay between corresponding events, such as rising edges, falling edges, zero crossings of the reference signal 33 and measurement signal 29. The change in the time delay versus optical wavelength provides the chromatic dispersion measurement for the optical system 22.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. A measurement scheme for characterizing chromatic dispersion of an optical system having a local access point and a remote access point, comprising:

a first receiver intercepting a global positioning satellite (GPS) signal and deriving a first timing signal from the GPS signal;

a signal generator coupled to the first receiver and generating a modulation signal synchronized to the first timing signal;

an optical source providing an optical signal at predetermined optical wavelengths;

a modulator coupled to the optical source, the signal generator, and the local access point, modulating the optical signal according to the modulation signal and providing a modulated optical signal to the local access point;

a demodulator coupled to the remote access point of the optical system, receiving the modulated optical signal and producing a demodulated signal;

a second receiver intercepting a GPS signal and deriving a second timing signal from the GPS signal;

a second signal generator coupled to the second receiver and generating a reference signal synchronized to the second timing signal;

a signal comparator coupled to the demodulator and the second signal generator, comparing the timing of the demodulated signal to the timing of the reference signal to determine the relative time delay between the demodulated signal and the reference signal at each of the predetermined optical wavelengths.

2. The measurement scheme of claim 1 wherein the signal comparator includes a phase comparator coupled to the demodulator and the second signal generator, comparing the phase of the demodulated signal to the phase of the reference signal to determine the relative time delay between the demodulated signal and the reference signal at each of the predetermined optical wavelengths.

3. The measurement scheme of claim 2 wherein the modulation signal is a sinusoidal signal.

4. The measurement scheme of claim 2 wherein the modulated optical signal is amplitude modulated.

5. The measurement scheme of claim 2 wherein the second signal generator and the phase comparator are included in a network analyzer, the reference signal provided by a stimulus port of the network analyzer, the demodulated signal applied to a measurement port of the network analyzer and the reference signal applied to a reference port of the network analyzer.

6. The measurement scheme of claim 1 wherein the signal comparator includes an oscilloscope, and comparing the timing of the demodulated signal to the timing of the reference signal includes measuring the time delay between corresponding events of the demodulated signal and the reference signal.

7. The measurement scheme of claim 6 wherein the modulation signal is a sinusoidal signal.

8. The measurement scheme of claim 6 wherein the modulated optical signal is amplitude modulated.

9. A measurement scheme for characterizing chromatic dispersion of an optical system having a local access point and a remote access point, comprising the steps of:

intercepting a global positioning satellite (GPS) signal and deriving a first timing signal from the GPS signal;

generating a modulation signal synchronized to the first timing signal;

providing an optical signal at predetermined optical wavelengths;

modulating the optical signal according to the modulation signal and providing a modulated optical signal to the local access point;

receiving the modulated optical signal at the remote access point and producing a demodulated signal;

intercepting a GPS signal and deriving a second timing signal from the GPS signal;

generating a reference signal synchronized to the second timing signal;

comparing the timing of the demodulated signal to the timing of the reference signal to determine the relative time delay between the demodulated signal and the reference signal at each of the predetermined optical wavelengths.

10. The measurement scheme of claim 9 wherein the step of comparing the timing of the demodulated signal to the timing of the reference signal includes comparing the phase of the demodulated signal to the phase of the reference signal and determining the relative time delay between the demodulated signal and the reference signal at each of the predetermined optical wavelengths from the phase comparison.

11. The measurement scheme of claim 9 wherein the modulation signal is a sinusoidal signal.

12. The measurement scheme of claim 9 wherein the step of modulating the optical signal includes amplitude modulating the optical signal.

* * * * *